United States Patent [19]

Curatolo et al.

[11] 4,393,192
[45] Jul. 12, 1983

[54] CRYSTALLINE COPOLYMERS PREPARED FROM N,N'-TEREPHTHALOYLDI-BETA-ALANINE AND A GLYCOL

[75] Inventors: Benedict S. Curatolo, Maple Heights; Gerald P. Coffey, Lyndhurst, both of Ohio

[73] Assignee: The Standard Oil Company, Cleveland, Ohio

[21] Appl. No.: 451,998

[22] Filed: Dec. 21, 1982

[51] Int. Cl.³ .................... C08G 69/08; C08G 69/44
[52] U.S. Cl. .................... 528/292; 528/274; 528/281; 528/285; 528/291
[58] Field of Search ............... 528/274, 281, 285, 291, 528/292

[56] References Cited

U.S. PATENT DOCUMENTS

| | | | |
|---|---|---|---|
| 2,998,412 | 8/1961 | Fletcher | 528/281 |
| 3,420,802 | 1/1969 | Scruggs . | |
| 3,660,356 | 5/1972 | Radlmann et al. . | |
| 3,714,126 | 1/1973 | Reid | 528/285 |
| 3,996,201 | 12/1976 | Buxbaum | 528/292 X |
| 4,069,209 | 1/1978 | Lange | 528/292 X |
| 4,283,524 | 8/1981 | Greene . | |
| 4,371,693 | 2/1983 | Wolfe | 528/291 X |

Primary Examiner—Lucille M. Phynes
Attorney, Agent, or Firm—William A. Heidrich; Herbert D. Knudsen; Larry W. Evans

[57] ABSTRACT

Novel water insoluble polyamide esters are prepared from dicarboxylic acid diamide derivatives of terephthalic acid and a glycol. In one embodiment, nearly perfectly alternating polyamide esters are prepared in the presence of antimony (III) acetate.

18 Claims, No Drawings

CRYSTALLINE COPOLYMERS PREPARED FROM N,N'-TEREPHTHALOYLDI-BETA-ALANINE AND A GLYCOL

BACKGROUND OF THE INVENTION

1. Field of the Invention

The invention relates to novel polymers containing amide and ester linkages and to an improved process for preparing such polymers. More specifically the invention relates to the crystalline polyamide esters prepared from N,N'-terephthaloyldi-beta-alanine and ethylene glycol.

2. Description of the Prior Art

Polyesteramides have been known to the textile industry since as early as 1932. The first polyamide esters were prepared by the reaction of a dibasic acid or its ester with amino alcohols or a mixture of a diamine and a glycol. The resulting polymers had poor color and low crystallinity and consequently received very little attention from the textile industry.

Improved techniques consisting of the use of intermediates containing performed amide linkages which prevented side reactions yielded polymers containing regularly recurring ester and amide groups with a more crystalline structure and good color. Such techniques have been applied to polyamide ester formation from dicarboxylic acid diamides and glycols.

The formation of recurring polyamide esters from a dicarboxylic acid diamide and a glycol has typically been a three step process. The first step entails the formation of the intermediate. A dicarboxylic acid diamide is reacted with an excess stoichiometric amount of the glycol to form the diglycol ester of the acid. The excess stoichiometric amount of the glycol is required because the reaction between the dicarboxylic acid diamide takes place more readily in excess glycol. The second step entails distilling off the excess glycol from the di-glycol ester of the acid. The final step is the polymerization of the intermediate where the diglycol ester of the acid is polycondensed at elevated temperatures, typically around 230°–260° C., under a reduced pressure, usually less than about 5 mm Hg. Under such conditions, high molecular weight polyamide esters are yielded in approximately 30 to 60 minutes.

The above techniques have not been satisfactory for the preparation of polyamide esters from dicarboxylic acid diamide derivatives of terephthalic acid and a glycol. U.S. Pat. No. 3,420,802 reveals a polymer prepared from the dimethyl ester of terephthalic acid diamide N,N'-di-ε-caproic acid and ethylene glycol reported to have a dark color and a melting point of 213°–216° C. New techniques, as described in the instant invention, have been able to overcome the problems of the prior art and produce a more desirable polyamide ester from a terephthalic acid derivative and a glycol.

SUMMARY OF THE INVENTION

Polyamide esters are prepared from dicarboxylic acid diamide derivatives of terephthalic acid and a glycol. In one embodiment, nearly perfectly alternating polyamide esters are prepared in the presence of antimony (III) acetate.

DETAILED DESCRIPTION OF THE INVENTION

Any dicarboxylic acid diamide derivative of terephthalic acid can be reacted with a glycol to form a water insoluble polyamide ester.

The Monomers:

Typically the dicarboxylic acid diamide derivative of terephthalic acid is of the general formula

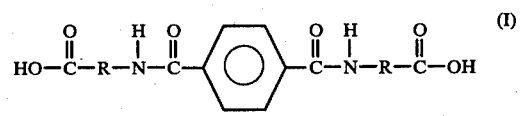

where each R is independently a $C_2$ to $C_{12}$ divalent aliphatic, alicyclic or aromatic radical. Preferably each R is independently a $C_2$–$C_{12}$alkylene radical. Most preferably each R is —$(CH_2CH_2)$— and the resulting compound is N,N'-terephthaloyldi-beta-alanine. These diacids can be synthesized by the straight forward reaction of terephthaloyl chloride and ω-amino acids containing 2 to 12 carbon atoms in a dilute NaOH solution.

Suitable glycols are of the formula:

where R' is any divalent aliphatic, alicyclic or aromatic radical. Preferably R' is a $C_2$–$C_8$aliphatic, $C_6$–$C_{17}$alicyclic or aryl. More preferably R' is a $C_2$–$C_8$alkylene radical or a one or two ring cycloparaffin radical of 6 to 17 carbon atoms. For example, R' may be one of:

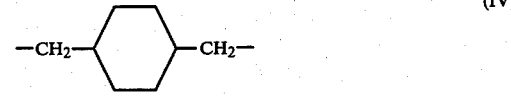

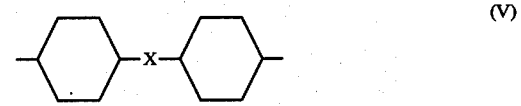

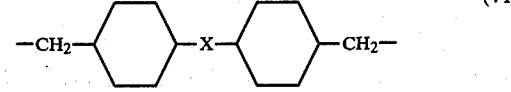

where X is one of $CH_2$, $C(CH_3)_2$, S, O, and $SO_2$. Many of these glycols are commercially available, others can be synthesized by the reduction of diacids or by other appropriate means which are known to those skilled in the art.

The Polyamide Esters:

The polyamide esters of the instant invention are formed by the polymerization of the diacid and the glycol. The structure of the resulting polyamide may be described as a single diacid unit alternating with one or more glycol units. This is because the diacid is a difunctional carboxylic acid, and it will not homopolymerize, while the glycol will homopolymerize such that the resulting polyamide ester may contain large blocks consisting of adjacent glycol units. The effect of large blocks of glycol units is to lower the melting point of the resulting polyamide ester to a degree which depends on the relative abundance of these units.

More specifically the polyamide esters of this invention are represented by the following structure:

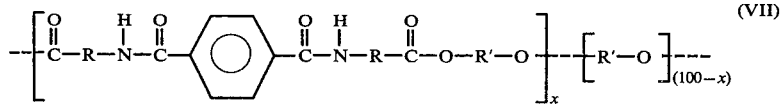

where x is a number of 0 to 100 and represents the percentage of the polyamide ester containing structural units donated by the diacid. Preferred polyamide esters result when x is greater than about 75. More preferred polyamide esters are when x is approximately 100, this latter formulation is subsequently referred to as an alternating polyamide ester. When x is less than 100, the resulting polymer is subsequently referred to as a random polyamide ester.

Random polyamide esters (i.e. where x is less than 100) are produced when the diacid and an excess amount of the glycol are heated at a temperature sufficient for polymerization to occur. The amount of excess glycol is between 2 and 20 times greater than a stoichiometric amount. The effect of excess glycol is to increase the number of glycol units in the ester which in turn lowers the melting point of the polyamide ester. Consequently, the desired amount of excess glycol is determined by the desired melting point for the resulting polyamide ester. The diacid and the excess glycol are heated at a temperature between 150° and 300° C., preferably between 170° and 230° C. and more preferably between 190° and 210° C. The diacid and the glycol are heated for a length of time sufficient for polymerization to occur.

An alternating polyamide ester, i.e. where x is approximately 100, is produced when stoichiometric amounts of the diacid and glycol are contacted with a catalytic amount of antimony (III) acetate, zinc acetate, calcium acetate, antimony trioxide or combinations thereof in a suitable solvent and heated at between 150° C. and 300° C., for a time sufficient for polymerization to occur. The preferred catalyst is antimony (III) acetate. The preferred temperature range for heating the reactants is between 170° C. and 230° C. and more preferably between 190° C. and 210° C.

Typically the amount of catalyst employed is between 0.5 wt percent and 5 wt percent and preferably about 2 wt percent of the total weight of the diacid and glycol. Suitable solvents include N-methyl pyrrolidone, dimethyl acetamide, dimethyl formamide and hexamethyl phosphoramide. The preferred solvent is N-methyl pyrrolidone.

A polyamide ester of Formula VII results from a condensation polymerization reaction. In such reactions, polymerization occurs primarily between pairs of functional groups with water as a by-product. This water is capable of destroying the catalyst and the catalyst is essential for the formation of the perfectly alternating polyamide ester. Consequently, it is preferred to remove nearly all water from the reaction as the water is produced. This may be accomplished by passing a dry inert gas, typically nitrogen, through the reactants, (e.g. sparging the reacting solution during the reaction) or it may be accomplished by the continuous evacuation of the reaction vessel (i.e. maintaining the reaction vessel at a pressure less than atmospheric pressure).

Typically for both the random polyamide ester and the alternating polyamide ester, the reactants are constantly agitated, e.g. by stirring or mixing, during the heating process. This agitation is preferred to achieve even dispersion of the reactants and catalyst. Lithium chloride is optionally added to the mixture to enhance solubility by breaking down hydrogen bonding in solution.

The reaction of the diacid with an excess stoichiometric amount of glycol to form the random polyamide ester differs in several ways from the reaction of the stoichiometric amounts of the diacid and the glycol to produce the perfectly alternating polyamide. No catalyst need be used for the random polyamide ester. No solvent need be used for the random polyamide ester. Lastly, the water by-product need not be removed for the random polyamide ester.

A preferred embodiment of the invention reacts N,N'-terephthaloyldi-beta-alanine (TBA) with ethylene glycol. The structures of TBA and ethylene glycol are as shown in formula I and II with R and R' being —(CH$_2$CH$_2$)—. Perfectly alternating, near perfectly alternating and random polyamide esters made from these two monomers contain a nylon-3 moiety. Fibers prepared from copolymers containing nylon-3 typically exhibit excessive moisture uptake. However, since the aromatic ring in TBA is hydrophobic, polyamide ester fibers prepared from TBA and ethylene glycol do not exhibit this excessive water uptake. Additionally, polymers made from TBA and ethylene glycol have very good thermal stability. Typically, these polyamide esters remain stable, i.e. no degradation, up to temperatures approximately 60° to 65° C. above their melting points. Other properties of polyamide esters made from TBA and ethylene glycol are as described in the examples.

SPECIFIC EMBODIMENTS

In order to provide a better understanding of the present invention, the following working examples are presented.

Each of the polymers produced in the following examples was subjected to infrared (IR) spectroscopy and nuclear magnetic resonance (NMR) spectroscopy to determine structure.

Comparative Example A

N,N'-terephthaloyldi-beta-alanine (6.16 g, i.e. 0.02 moles), ethylene glycol (1.36 g, i.e. 0.02 moles), p-toluenesulfonic acid (0.376 g) and N-methyl pyrrolidone (80 g) were placed in a 250 ml, 3 neck (24/40) flask equipped with a water-cooled condenser, thermometer, magnetic stirbar and nitrogen sparge.

The solution was heated at 200° C. (while stirring) for 24 hours. No water insoluble polymer was formed.

EXAMPLE 1

N,N'-terephthaloyldi-beta-alanine (15.4 g, i.e. 0.05 moles), ethylene glycol (3.41 g, i.e. 0.05 moles), antimony (III) acetate (0.376 g, i.e. 2 wt percent) and N-methyl pyrrolidone (150 g) were placed in a 250 ml, 3 neck (24/40) flask equipped with a water-cooled condenser, thermometer, magnetic stirbar and nitrogen sparge. After 27 hours at 200° C. the product solution was poured into 700 ml distilled water in order to isolate a tan solid. This product was washed with additional water, then dried in a vacuum oven. Total product yield was 13.94 g.

IR and NMR confirmed a polyamide ester with the following alternating structure:

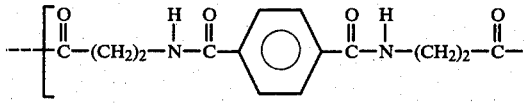

The above polyamide ester was water insoluble, had 36 percent crystallinity, a melting point of 235° C. and thermal stability to 295° C. in air or nitrogen.

EXAMPLE II

N,N'-terephthaloyldi-beta-alanine (15.40 g, i.e. 0.05 moles), and ethylene glycol (50.0 g, i.e. 0.8 moles) were placed in a mini-Parr reactor which was nitrogen purged for 5 minutes then sealed. The reactants were stirred slowly during the purge and while being heated at 200° C. for 19 hours. The pressure in the reactor was then vented and the reactor was purged with nitrogen for one hour with the temperature held at 200° C.

The product solution was taken out of the reactor and poured into 800 ml distilled water. The solid polymer was separated by filtering using a Buchner funnel. Total product yield was 11.6 grams.

The product was determined to be 74.4 percent hot water insoluble by Soxhlet extraction (16 hours). IR and NMR spectroscopy revealed the following structure

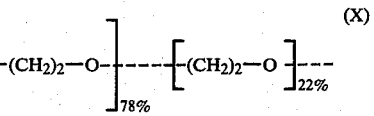

The above polyamide ester has a sharp, stable melting point at 190° C. and reveals no thermal degradation until 285° C. as determined by Differential Scanning Calorimetry.

EXAMPLE III

The procedure of Example I was repeated except for the use of only 0.188 grams of antimony (III) acetate (1.0 wt percent) and the addition of 0.940 grams of LiCl (5.0 wt percent).

The product yield was 5.92 grams of the polyamide ester shown in Formula IX. This polyamide ester was water insoluble and had a 51 percent crystallinity.

Comparative Example B

The procedure of Example III was repeated in the absence of antimony (III) acetate, i.e. no catalyst was added. No water insoluble polymer was produced.

Although only a few embodiments of the present invention have been described above, it should be appreciated that many additions and modifications can be made without departing from the spirit and scope of the invention. These and all other modifications are intended to be included within the scope of the present invention, which is to be limited only by the following claims.

The claimed invention is:

1. Novel water insoluble polyamide esters of the general formula:

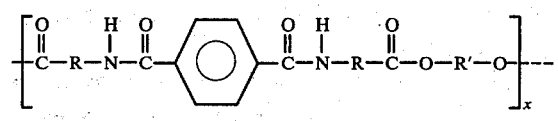

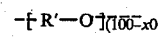

where each R and R' independently are a divalent aliphatic, alicyclic or aromatic radical;
x is a number of 0 to 100 and represents the percentage of the polyamide ester chain structure containing the following unit:

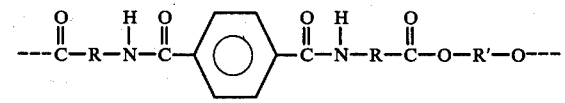

2. The polyamide ester of claim 1 where each R is a $C_2$–$C_{12}$ alkylene radical.

3. The polyamide ester of claim 1 where R' is $C_2$–$C_8$ aliphatic radical, a $C_6$–$C_{17}$ alicyclic radical or a phenyl radical.

4. The polyamide ester of claim 2 where R' is a $C_2$–$C_8$ alkylene radical or a $C_6$–$C_{17}$ one or two ring cycloparrafin radical.

5. The polyamide ester of claim 1 each R and R' are —($CH_2CH_2$)—.

6. The polyamide ester of claim 1 where x is greater than 75 and less than 100.

7. The polyamide ester of claim 1 where x is approximately 100.

8. A process for preparing the water insoluble polyamide ester of claim 7 from a dicarboxylic acid diamide and a glycol comprising:
(a) mixing in solvent stoichiometric amounts of the dicarboxylic acid diamide and the glycol in the presence of a catalyzing amount of a catalyst consisting of at least one of antimony (III) acetate, zinc acetate, calcium acetate and antimony trioxide;
(b) heating with agitation the mixture at between 150° and 300° C. for a time sufficient for polymerization to occur; and
(c) removing substantially all the water produced by the reaction of the monomers.

9. The process of claim 8 where amount of catalyst is approximately between 0.5 and 5.0 wt percent of the total weight of the dicarboxylic acid diamide and glycol.

10. The process of claim 9 where the amount of catalyst is approximately 2 wt percent of the total weight of the dicarboxylic acid diamide and glycol.

11. The process of claim 8 where the catalyst is antimony (III) acetate.

12. The process of claim 8 where the mixture is heated between 190° C. and 210° C. for approximately 24 hours.

13. The process of claim 8 where the solvent is one of N-methyl pyrrolidone, dimethyl acetamide, dimethyl formamide and hexamethyl phosphoramide.

14. The process of claim 13 where the solvent is N-methyl pyrrolidone.

15. The process of claim 8 where the means for removing the water by-product comprises the continuous passing of an inert gas through the reactants in solution.

16. A process for preparing water insoluble polyamide esters of claim 6 from a dicarboxylic acid diamide and a glycol comprising:
(a) mixing the diacid diamide with an excess stoichiometric amount of the glycol; and
(b) heating with agitation the mixture at approximately between 150° and 300° C. for a time sufficient for polymerization to occur.

17. The process of claim 16 where the excess stoichiometric amount of the ethylene glycol is between 2 and 20 times greater than a stoichiometric amount.

18. The process of claim 16 where the mixture is heated at between 190° C. and 210° C. for approximately 20 hours.

* * * * *